United States Patent [19]

Barr

[11] Patent Number: 4,558,954
[45] Date of Patent: Dec. 17, 1985

[54] EXTRUDER SCREW AND POSITIVE DISPLACEMENT WAVE PUMP ASSEMBLY

[76] Inventor: Robert A. Barr, P.O. Box 4476, Virginia Beach, Va. 23454

[21] Appl. No.: 680,971

[22] Filed: Dec. 12, 1984

[51] Int. Cl.$^4$ .......................... B29B 1/06; B29B 1/10; F01C 19/02
[52] U.S. Cl. ........................................ 366/90; 366/89; 366/322; 366/323; 264/176 R; 425/208; 198/671
[58] Field of Search ................ 425/206, 208; 366/79, 366/89, 90, 88, 322, 323; 418/96, 12; 264/176 R

[56] References Cited

U.S. PATENT DOCUMENTS

| | | |
|---|---|---|
| 1,892,217 | 12/1932 | Moineau . |
| 2,028,407 | 1/1936 | Moineau . |
| 2,212,417 | 8/1940 | George . |
| 2,483,370 | 9/1949 | Moineau . |
| 2,505,136 | 4/1950 | Moineau . |
| 2,512,764 | 6/1950 | Byram . |
| 2,527,670 | 10/1950 | Allen . |
| 2,527,673 | 10/1950 | Byram . |
| 2,532,145 | 11/1950 | Byram . |
| 2,545,604 | 3/1951 | Byram . |
| 2,545,626 | 3/1951 | Moineau . |
| 2,612,845 | 10/1952 | Byram . |
| 2,691,347 | 10/1954 | Zimmer . |
| 2,796,029 | 6/1957 | Bourke . |
| 2,862,454 | 12/1958 | Alcock . |
| 2,924,180 | 2/1960 | Bourke et al. . |
| 3,011,445 | 12/1961 | Bourke . |
| 3,084,631 | 4/1963 | Bourke . |
| 3,203,350 | 8/1965 | Chang . |
| 3,652,192 | 3/1972 | Kramer ................ 418/125 |
| 3,698,541 | 10/1972 | Barr ................ 425/208 X |
| 3,804,564 | 4/1974 | Kramer ................ 418/96 |
| 3,858,856 | 1/1975 | Hsu ................ 366/88 |
| 4,000,884 | 1/1977 | Chung ................ 366/88 |
| 4,405,239 | 9/1983 | Chung et al. ................ 425/208 X |
| 4,534,652 | 8/1985 | Stade ................ 366/88 X |

Primary Examiner—J. Howard Flint, Jr.
Attorney, Agent, or Firm—Mason, Fenwick & Lawrence

[57] ABSTRACT

A screw extruder and positive displacement wave pump assembly for plasticating or melting solid plastic material or the like, including an extruder screw member in an elongated cylindrical barrel having an upstream end and a downstream or discharge end, the screw being rotatably housed in portions of the barrel adjacent the upstream end. The screw has a helical thread of plural turns integral with the core of the screw having a minimum clearance to the barrel for feeding the plastic material along the screw from its feed end to its discharge end. A positive displacement wave pump is located in the barrel near the outlet end having a stator frame and a rotor member rotatable therein coupled to and driven by the screw, the rotor member having an outer surface of developed helical coutour providing a plural turn helical thread of wide rounded form to position a stack of slidable sealing discs guided for diametric sliding movement by the rotor passing therethrough to form a series of pumping pockets which progress longitudinally through the pump section.

20 Claims, 10 Drawing Figures

EXTRUDER SCREW AND POSITIVE DISPLACEMENT WAVE PUMP ASSEMBLY

PRIOR RELATED APPLICATIONS

The present invention relates to my earlier U.S. Patent Application Ser. No. 648,040 filed Sept. 6, 1984 entitled Extruder Screw and Positive Displacement Pump Assembly.

BACKGROUND AND OBJECTS OF THE INVENTION

The present invention relates in general to extruder screw assemblies for extruding polymers and the like, and more particularly to an extruder screw and positive displacement wave pump structure for extruding plastics and the like.

Employment of a screw or the like in an extruder for working wide ranges of solid plastic material into a substantially homogeneous molten state suitable for formation into any desired shape by extrusion or injection into a die or mold has become well known.

Extrusion, injection molding or blow molding with a single screw extruder includes feeding the solid polymeric or plastic material in pellet, chip, powder, or flake form to the feed end of the extruder through a hopper mounted on an opening of the heated barrel in which a screw is rotatably mounted. The screw has at least one helical thread with a minimum clearance to the barrel, integrally formed on the core to create a helical channel, along which the plastic material is moved downstream from the feed end to the discharge end by forces exerted by the rotation of the screw. The solid plastic material fed into the screw channel is compacted into a solid plug or solid bed and the solid bed melts as it travels down the screw channel. The molten plastic material is collected by the wiping action of the thread into a melt pool. The melt pool gradually increases as the solid bed gradually melts, eventually occupying the entire screw channel.

Molten plastic materials have a very high viscosity and a large amount of heat is generated in the melt pool due to shearing of the melt pool by the rotation of the screw. Thus, the melt pool becomes hotter as it travels down the screw channel and often becomes undesirably hot by the time it reaches the discharge end. Heat transfer from the melt pool to the solid bed is inefficient because of the low thermal conductivity of plastic materials and the limited contact area between the melt pool and the solid bed. Increased heat transfer from the hot, molten plastic material in the melt pool to the cold, solid plastic material in the solid bed is highly desirable in order to reduce the temperature of the molten plastic material discharged from the extruder, increase melting capacity of the extruder and the increase energy efficiency of the extrusion process.

Example of extruder screws which have come into substantial use for working plastic material and feeding it by extrusion or injection into a die or mold are found in Robert A. Barr U.S. Pat. No. 3,698,541, Chan I. Chung, U.S. Pat. No. 4,000,884, and more recently an energy efficient extruder screw disclosed in Chung and Barr U.S. Pat. No. 4,405,239. These can be broadly described as a screw having a first or main screw thread and a second screw thread which divides the screw channel into a pair of side by side sub-channels of equal width. The diameter of the second thread is sufficiently smaller than the diameter of the barrel such that its clearance to the barrel allows the plastic material to flow over the second thread. The depths of the two side-by-side sub-channels vary continuously and oppositely along the length of the passages so that the combined passage cross-sectional area of the two sub-channels is maintained constant. As one sub-channel becomes shall in depth with diminishing cross-section area, the other sub-channel becomes deeper correspondingly with enlarging cross-sectional area, so that the plastic material is forced to move from the diminishing sub-channel into the enlarging sub-channel flowing over the second thread. The second thread gives shearing to the plastic material while flowing over it. Such mechanism of moving the plastic material from one sub-channel into the other sub-channel is repeated a number of times.

It is well known in the plastic and rubber industries that such a single screw type of extruder is not a positive displacement device. This means that the restriction to flow downstream of the extruder which creates high pressure at the extruder outlet reduces the pumping rate of the extruder. To obtain higher rates, it is then necessary to run the extruder at higher revolutions per minute. This has the disadvantage of raising the temperature of the extruder, due to the increase shear eventually beyond what is tolerable to the process.

It has been known in the industry that the pressure on the extruder can be reduced to very low levels by using a positive displacement pump between the extruder and process die such as a gear pump. Driven separately, this is able to pump against very severe flow restrictions, where high pressures occur, and yet provide very low pressure at the pump inlet, which is the extruder outlet, enabling the extruder to perform at much higher revolution rates. However, the gear pump drive system and the in-line space it takes up makes it an expensive and troublesome addition and a real problem to add to existing lines.

In my prior application identified above, I have disclosed an assembly involving a single screw type extruder screw and positive displacement pump assembly, wherein the extruder screw at its discharge end is coupled to and drives a Moineau type pump, designed to keep the extruder head pressure low while the positive displacement Moineau type pump provides the pumping force to overcome the downstream process restrictions to flow. However, certain disadvantages have been identified as an inherent property of that type of construction. With the Moineau type pump, either the rotor or the stator must be free or orbit around the center of rotation of the input shaft. This is because of the nature of the Moineau type pump wherein the confronting services of the rotor and the stator are rounded helical thread configurations of different pitch providing pumping pockets which progress longitudinally from the input to the output end of the positive displacement pump section. Because of the necessity of enabling either the rotor or the stator, usually the rotor, to orbit around the center of rotation of the input shaft, a rather complex coupling must be provided between the output or discharge end of the extruder screw section and the input end of the positive displacement pump section to allow this relative movement of the center of rotation of the positive displacement pump rotor relative to the center of rotation of the extruder screw. The design of this coupling to allow the rotor to orbit the input shaft is complicated in an extruder, because the thrust exerted on the rotor at the output end, due to the high pressure which occurs there, requires the coupling to be capable of absorbing that pressure. Since the coupling in that arrangement is entirely surrounded by a molten polymer at about 350° to 600° F. at about 500 to 1200 psi, the lubrication of the coupling becomes a real problem. Using the polymer which is flowing through the extruder screw assembly to lubricate the coupling is possible, but creates the added disadvantage that if there is any retention of polymer in the coupling, it will degrade in time and can sluff off, causing contamination of the extruded product.

Furthermore, the coupling itself requires a certain length to accommodate the orbiting which is necessary for the rotor, introducing space requirements because of the length necessary for the coupling as well as the positive displacement pump section. In a restricted space such as occurs in an extruded barrel installation where one wishes to minimize the length of the barrel occupied by the pump portion to maximize effective screw length for the extruder screw section to obtain greater output capacity (melting capacity), the elimination of the need for a flexible coupling introduces a real advantage.

Also, the volumetric capacity of the Moineau type positive displacement pump per revolution of the input shaft, in this case the extruder screw section, is fixed by the design of both the rotor and stator of the Moineau type pump. It is desirable to be able to change the volumetric capacity of the positive displacement pump section of an extruder scew and pump assembly, for example by using a rotor with a different pitch so that the ability to readily substitute a rotor with a different pitch and achieve a desired change of volumetric capacity becomes a highly desirable advantage.

An object of the present invention, therefore, is the provision of an extruder screw and positive displacement pump assembly of novel design eliminating the need for a coupling between the extruder screw section and the pump section capable of accommodating orbiting of the pump section rotor relative to the axis of rotation of the extruder screw, and which obviates the disadvantages and provides the advantages described in the foregoing discussion.

Other objects, advantages and capabilities of the present invention will become apparent from the following detailed description taken in conjunction with accompanying drawings illustrating a preferred embodiment of the inventions.

DETAILED DESCRIPTION OF A PREFERRED EMBODIMENT

Referring to the drawings, wherein like reference characters designate corresponding parts throughout the several figures, the single screw extruder and positive displacement pump assembly of the present invention includes a cylindrical barrel 2 of the extruder having a single screw extruder indicated by the reference character 1, which may have the specific construction of a number of extruder screws, such as the extruder screw of the Chung U.S. Pat. No. 4,000,884, or the Barr U.S. Pat. No. 3,698,541, or the Hsu U.S. Pat. No. 3,858,856 or other known commercial extruder screws, but will be described as an assembly involving the extruder screw of U.S. Pat. No. 4,405,239 in the illustrated example. In the assembly, the outlet end portion of the extruder screw is coupled, by a structure later described in detail, to the positive displacement pump structure indicated by the reference character 3 occupying the zone adjacent the outlet end of the cylindrical barrel 2 defined by the extruder device. In the illustrated example, the extruder screw 1 has at least one helical thread 4 with a minimum clearance to the barrel 2 integrally mounted or formed on its core 1a. Thread 4 creates a helical channel 5 radially extending around core 1a of screw 1. The number of turns of thread 4 around core 1a will be called hereinafter, "turns" for brevity. The axial distance between one turn of thread 4 is called "pitch".

A solid plastic material, or a mixture of materials, in pellets, chip, powder or flake form is fed into channel 5 through a hopper and travels down channel 5 by forces exerted by the rotation of screw 1. At A, a portion of channel 5 toward the feed end starts to gradually decrease its depth while the other portion of channel 5 toward the discharge end starts to gradually increase its depth. A second thread 10, which is substantially parallel to thread 4 and has a larger clearance to barrel 2 comparable to but not less than the depth of the front channel portion at B, originates at B rising from the floor of channel 5 and divides channel 5 into two sub-channels, a front channel and a back sub-channel 12.

Second thread 10 converts to become thread 4 at C while thread 4 converts to become second thread 10 at D which is located on thread 4 substantially across C toward the discharge end. The maximum depth of front sub-channel 11 is maintained between C and E which is located at about one-half to preferably one turn toward the discharge end from C. The structural features between B and D are repeated between D and F in substantially the same way, causing a major portion of the plastic material, both solid and molten, collected in front sub-channel 11, to move back into back sub-channel 12 again by the forces exerted by the rotation of screw 1. The movement of the plastic material to the opposite direction of the natural movement requires a high pressure buildup in the delivery sub-channel, and the high pressure can cause undesirable heat buildup and reduction in the pumping capacity of screw 1. The structural features between B and D may be repeated in substantially the same was as many times as desired between F and G. The depths of front sub-channel 11 and back sub-channel 12 and the clearance of second thread 10 may be different from those used between B and D in each repeat cycle in order to achieve the optimum mixing and melting functions of screw 1. Second thread 10 terminates at G, and front sub-channel 11 and back sub-channel 12 merge to become a single channel by gradually changing their depths to a common depth at H which is located about one-half to one turn toward the discharge end from G. Second thread 10 may be present between G and H, terminating at H. The depth of channel 5 ususally is kept constant from H to the end of screw 1.

In the extruder assembly of the present invention, the means for achieving improvement in the pumping rate is provided by including a positive displacement wave pump section of novel construction, indicated generally by the referenced character 15, coupled to the discharge end 1D of the extruder screw 1 by simply threading the upstream end of the rotor member, indicated by referenced character 16 to the downstream end of the extruder screw 1. In the preferred embodiment of the present invention, the positive displacement wave pump section 15 comprises a rotatable internal element forming a rotor 16, whose outer exterior surface in the illustrated embodiment includes a cylindrical upstream end portion 17 having a hollow cavity 17A which is internally threaded, adapted to be assembled onto a similarly externally threaded discharge end formation 1D' on the extruder screw 1 to permit the rotor to be assembled and disassembled from the extruder screw by conventional screw threading techniques. The downstream end portion 18 of the rotor 16 is of smaller diameter than the upstream end portion 17 and is of hexagonal configuration as illustrated to facilitate application of a hex socket wrench of similar tool to facilitate removal of the rotor 16 from the extruder screw section 1 when desired.

The portions of the rotor 16 between the cylindrical upstream end portion 17 and the hexagonal downstream smaller cross-section end portion 18 form a helically contoured section 19 similar to the configuration of the exterior surface of the rotor of a Moyno gear pump of the types produced commercially by Robbins & Myers, Inc. and embodying the principles disclosed in U.S. patents to R. J. L. Moineau, such as U.S. Pat. Nos. 1,892,217 and 2,028,407. The helically contoured rotor outer surface of the helical rotor portion 19 define what may be described as helical threads of wide rounded form forming a plurality of rounded helical threads or turns orbiting about the extended center axis of the extruder screw 1 and the center axes of the inlet cylindrical rotor portion 17 and downstream end portion 18. A stator frame assembly indicated generally at 20 spans most of the axial length of the wave pump section rotor 16, and includes a first frame member having an inlet portion 21 and side frame portion 22 integrally joined together and an outlet end member 23 collectively outwardly surrounding the rotor 16 and capturing a stack of slide discs indicated generally at 24 forming sealing discs and illustrated more particularly in FIG. 2, 3, 6, 7 and 8A–8C.

The stator frame member 20, as will be apparent from the drawings, has a cylindrical outer perimeter indicated at 20a along the two horizontally opposite lateral portions thereof over the span of the inlet portion 21, side frame portions 22 and outlet end member 23, conforming to the inner diameter of the cylindrical confronting surface of the barrel or bore of the extruder tube, to fit tightly against the confronting surface of the extruder barrel or bore and be fixed thereagainst by any suitable means. As will be apparent particularly from FIGS. 2, 3, 6 and 7, the inlet end portion of the stator frame member 20 has a beveled or chamfered throat 25 lying in a truncated conical path concentric with the center axis of the rotor 16 joining a cylindrical inlet passage portion 26 which extends to a shoulder formation 27 forming the upstream bearing shoulder for the stack of slide discs 24.

The opposite side frame portions 22 of the stator frame member 20 extending from the inlet portion 21 to the outlet end member 23 have a cylindrical outer or exterior surface 20a and a straight or rectilinear inner surface 22b defining guide surfaces for the opposite lateral edges or flats of the slide discs 24 limiting them to rectilinear reciprocative sliding movement parallel to the vertical axis only, through the center axis of the rotor 16.

The downstream end of the slide frame portion 22 of the stator frame member 20 has an annular tongue formation 28 which interfits into a correspondingly shaped annual grove formation 29 in the outlet end member 23 for intercoupling the outlet end member and the stator frame portions 22. The upstream end portion of the outlet end member 23 provides an axially elongated annular lip or flange formation 30 which shoulders against a transition shoulder portion 28a of the annular tongue formation 28 and provides an upstream annular shoulder face 31 confronting the slide disc 24 at the downstream end of the pack of slide discs, coactive with the shoulder formation 27 of the inlet portion 21 to capture the stack of slide discs 24 therebetween.

Figure 6:
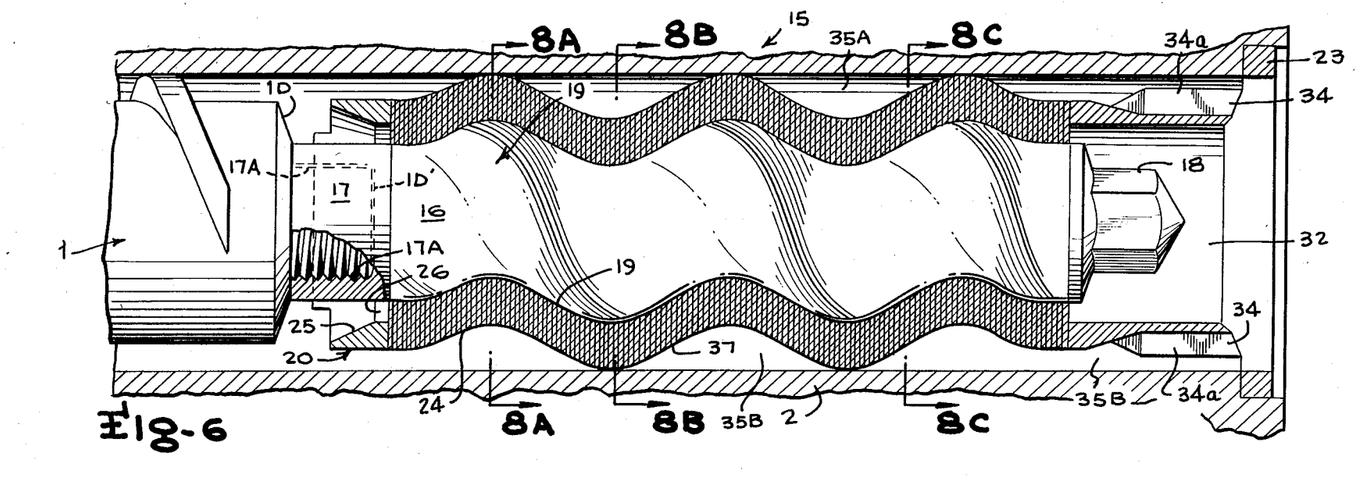
FIG. 6 is a vertical longitudinal sectional view, taken along line 6—6 of FIG. 4.
Figure 7:
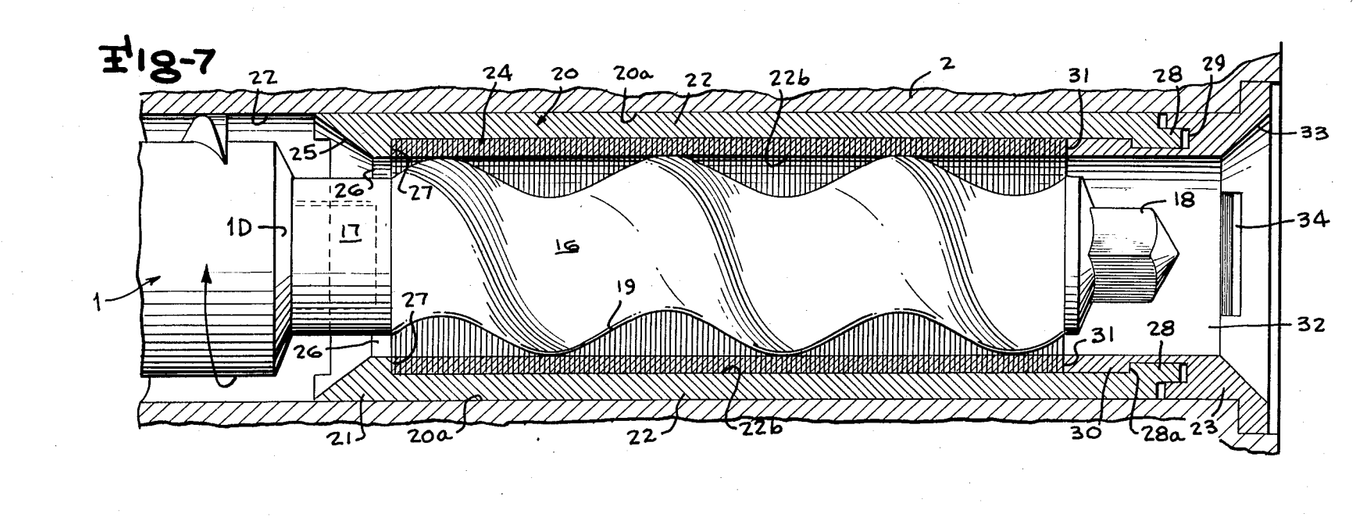
FIG. 7 is a horizontal longitudinal sectional view taken along line 7—7 of FIG. 4.

As will be seen particularly from FIGS. 6 and 7, the outlet member 23 has a cylindrical bore portion 32 concentric with the center axis of the rotor 16 of the same diameter as the major axis diameter of the elliptical or oval center opening of the slide discs as later described, which merges into an outwardly beveled or flared frusto conical surface portion 33 forming the discharge or outlet opening for the extruder. Diametrically opposite portions of this beveled surface 33 are provided with openings 34 communicating with passages 34a at vertically diametrically opposite portions of the intermediate regions of the body of the outlet end member 23 which open in an upstream direction to the spaces 35A and 35B above and below, respectively, the cylindrically curved arcuate upper and lower edge portions 36, 37 of the discs 24.

Figure 1:
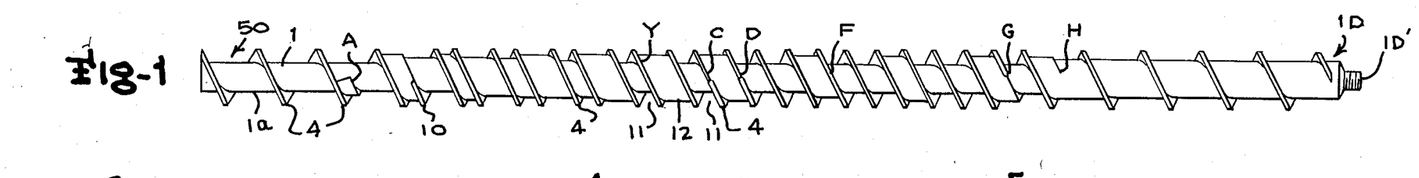
FIG. 1 is a somewhat schematic side elevational view of a conventional single screw extruder section which may be coupled with a positive displacement pump structure to drive the latter, embodying the present invention.
Figures 2, 5:
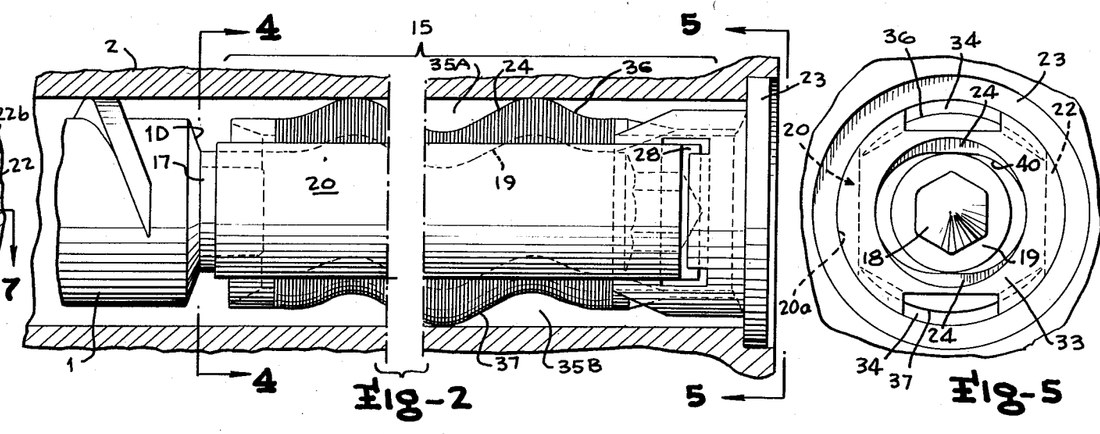
FIG. 2, is a somewhat diagramatic side elevational view, to larger scale, of the discharge end of the screw section and the positive displacement wave pump section connecting the outlet end of the extruder screw portion, with the barrel shown in section.
FIG. 5 is a vertical transverse section view taken at the outlet end of the pump section along line 5—5 of FIG. 2.
Figure 3:
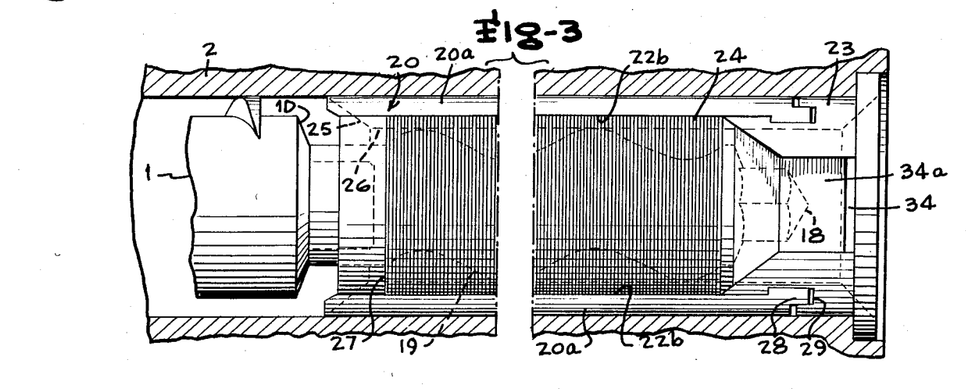
FIG. 3 is a fragmentary top plan view of the wave pump section, with the barrel shown in section.
Figure 4:
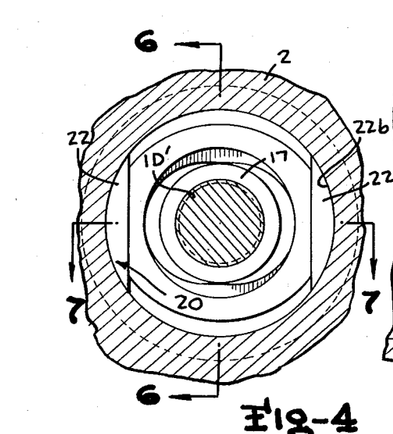
FIG. 4 is a vertical transverse section view taken at the inlet end of the pump section along line 4—4 of FIG. 2.
Figure 8A:
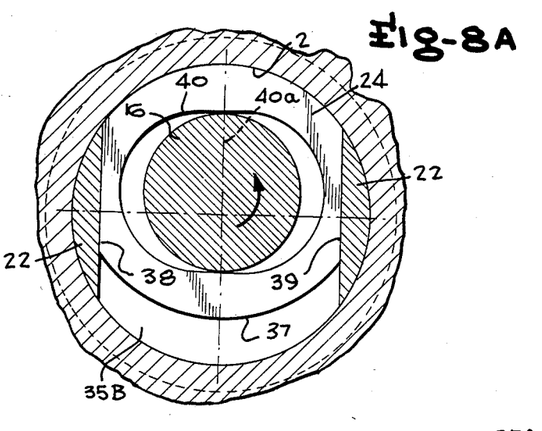
FIGS. 8A, 8B and 8C are transverse vertical section views taken along the lines A—A, B—B, and C—C of FIG. 2, showing positions of the rotor and slide discs of the disc pack at the sectional positions indicated.
Figure 8B:
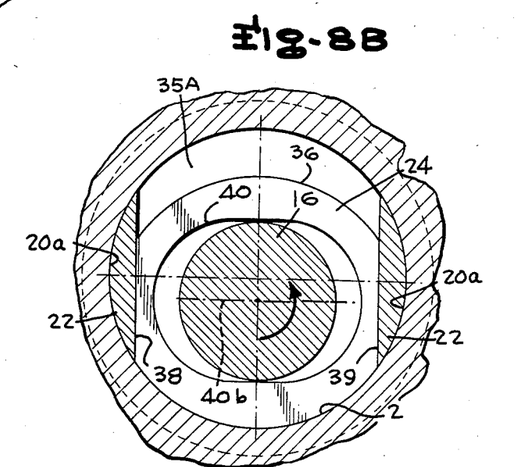
Figure 8C:
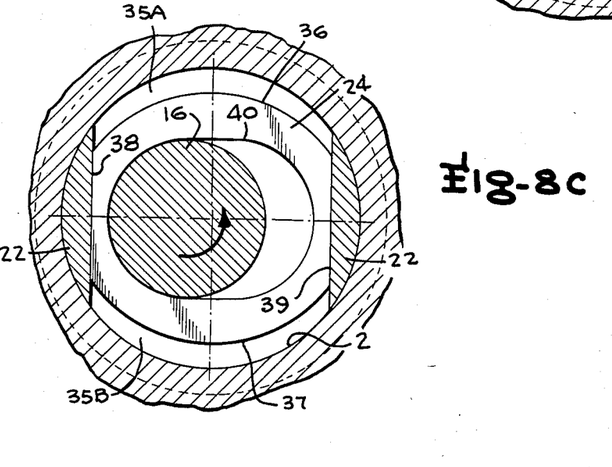

As will be apparent from FIGS. 8A–8C, each of the discs 24 are of identical configuration, wherein the outer diameter or edge is in the shape of a twice interrupted or truncated circular or cylindrical shape shown at 20a interrupted by two diametrically opposite flats or straight edge sections 38, 39 along chords of the circle in which the upper and lower arcuate cylindrical edges lie, providing parallel vertically extending straight edge surfaces 38 and 39 which slidably bear against confronting surfaces of the side frame portions 22 of the stator frame member 20. Thus the stator frame member 20 maintains the pack of sealing discs 24 in a face-to-face contacting stacked array of discs each capable of freely sliding vertically relative to each other along the vertical axis through the center of the barrel or bore 2 of the extruder paralleling the planes of the vertical flats or straight edges 38, 39. The center opening 40 of each of the discs 24 is in the form of a laterally elongated oval having a vertical minor axis 40a and a horizontal transverse major axis 40b to accommodate the maximum lateral span of the crests of the rounded helical threads of the rotor 16. The dimension of the minor axis 40a corresponds exactly to the diameter of the rotor 16 in the cylindrical portions thereof and the diameter of any circular cross-section of the helical thread portion thereof, so that the discs 24 are shifted vertically up and down relative to each other to provide wave patterns resembling what is illustrated in FIGS. 2 and 6 providing pumping pockets which progress longitudinally from the inlet end to the outlet or discharge end of the wave pump section as the helically threaded rotor 16 is rotated by the extruder screw section 1.

By the above described construction, wherein the positive displacement wave pump section 15 is coupled to and driven by the extruder screw section 1, the plastic material being forced toward the discharge or delivery end of the extruder screw section 1 by the threads of the extruder screw flows into the passages or spaces lying outwardly of the outer periphery of the upstream inlet portion 21 of the stator frame member 20 and the confronting surface of the barrel 2 of the extruder and the spaces between the convex arcuate cylindrical edges 24a of the sealing slide discs 24 and the confronting surface the barrel 2, and the plastic polymer material being extruded also flows into the throat 25 of the inlet end portion 21 of the stator frame member 20 and passes into the spaces occurring between the oval shaped center opening 40 of the discs 24 at the outer regions of the major axis 40b thereof and the exterior surface of the circular cross-section rotor 16. Since the surfaces of the center openings 40 of the discs 24 contact the exterior surface of the rotor 16 all along its length down the center line of the pump, this contact creates a sealing line, preventing the polymer from leaking back so that it must move with the volume being displaced by the rotor shape as it rotates. Also, the convex arcuate curved outer surfaces 24a of the discs are positioned in a pattern and progressively brought into contact with the confronting surfaces of the barrel 2 to create a series of pumping pockets between the outer convex edges 24a of the sealing discs 24 and the surface of the barrel 2, which pumping pockets are moved longitudinally through the pump forcing the polymer material to move towards the discharge end of the positive displace wave pump section.

Because of the design of the components of the positive displacement wave pump section, high pressure at the outlet end, which would normally be acting on the full disc area and would cause very high frictional forces between the discs, is releaved, since the configuration of the outlet member 23 is such that most of the projected area of the cross-section is transferred by the outlet member 23 to the barrel. Conversely, the inlet portion 21 of the stator frame assembly 20 is designed to exert the full inlet pressure onto the disks themselves thus counter-acting any pressure from the outlet end. Because of the construction, the inlet portion 21 of the stator frame assembly 20 is free to undergo some movement in the appropriate direction so that the inlet pressure is free to act on the discs 24.

The above described assembly of extruder screw section 1 and positive displacement wave pump section 15 provides an arrangement wherein neither the rotor nor the outer portion of the wave pump section have to be free to orbit, as would be the case in the use of a Moineau type pump arrangement, so that no coupling is required and the rotor can be rigidly attached to the discharge end portion of the extruder screw member 1. Thus the axial length of a barrel for such an assembly with the wave pump section 15 can be reduced relative to an assembly involving a Moineau pump since one does not need to account for the length of the flexible coupling required in the Moineau pump type arrangement. A further advantage arises from the design of the present construction since some of the polymer passes into the spaces defined between the surfaces of the oval center openings 40 of the discs 24 and the exterior surface of the circular cross-section rotor 16, which effects a significant increase in pumping capacity due to the pumping action occurring between the helical surface of the rotor 16 and the bore of the discs 24 defined by their oval center opening. This pumping of the polymer in the spaces defined between the rotor 16 and the bore of the discs 24 permits an increase of about 50 percent in the pumping capacity as well as achieving good lubrication of the contact points between the rotor surface and the surfaces of the disc openings 40 which see a lot of load.

With this arrangement, pressure on the extruder can be reduced to very low levels so that the extruder screw is able to pump against very severe flow restrictions and yet with very low pressure at the extruder outlet (the wave pump section inlet), enabling the extruder to perform at much higher rates per revolution of the screw. Thus the extruder screw head pressure is very low, the positive displacement wave pump providing the pumping force to overcome the down stream process restrictions to flow.

Also, the screw thread connection at 17A, 1D between the pump section 15 and the screw section 1 facilitates removal of the rotor to change it in the extruder for a different pitch rotor to change the pumping capacity. This is important since the exact capacity of the extruder screw can be different polymers and blends of polymers. If the inlet pressure is too high or too low the rotor can be readily changed without removing the extruder screw.

I claim:

1. A screw extruder assembly for plasticating or melting solid plastic material or the like, comprising a barrel defining an elongated cylindrical bore having an upstream end and an outlet end, a screw rotatably housed in an upstream portion of said bore for rotation about a fixed axis forming the center axis of the bore and having a feed end and a discharge end, said screw having a section between the feed end and discharge end thereof comprising at least one helical thread having plural turns integral with the core of said screw, said thread originating at the feed end of said screw creating a helical channel in the space between successive turns of the thread and having a minimum clearance to the surface of the bore to feed the plastic material along the screw from the feed end to the discharge end, a positive displacement wave pump in said bore located between the discharge end of said screw and said outlet end, said pump having a stator frame provided with cylindrical outer surface portions engaging and conforming to the surface of said cylindrical bore and being supported against rotation in the bore, a rotor member having a helically contoured outer surface defining a plural turn helical thread formation of wide rounded form to orbit about the extended center axis of said extruder screw, means coupling said rotor member to the discharge end portion of said screw to be driven thereby for rotation in the stator frame, a slide disc stack of a plurality of slidable sealing discs in face to face contact with each other extending along the major portion of the axial length of the stator frame and supported thereby for reciprocative sliding movement parallel to a first diametric plane of said cylindrical bore, the slide discs forming sealing discs having opposite outwardly convex cylindrically curved surface edge portions to be moved toward confronting surface portions of said cylindrical barrel into sealing engagement therewith and be withdrawn to a range of positions spaced from said bore surface portions towards the center axis thereof by said rotor member upon rotation of the latter, the discs having shaped center apertures receiving the rotor member therethrough and accommodating movement of the full diametric range of movement of the crests of said helical thread means in a second diametric direction perpendicular to said first diametric plane, the rotor and sealing slide discs and confronting surfaces of said bore forming a series of pumping pockets between the convex outer edge portions of the sealing discs and the surface of the bore which pumping pockets are moved longitudinally through the pump to force the plastic material to move toward the discharge end of the positive displacement wave pump section and the rotor and bounding surfaces of said apertures of the discs also forming pumping pockets to force plastic material to move through said apertures toward said discharge end.

2. A screw extruder assembly as defines in claim 1, wherein said stator frame includes a pair of diametrically opposite side frame portions joining an inlet portion and extending substantially the axial length of the slide disc stack spaced transversely from the center axis of the bore in said second diametric direction and having inwardly facing guide surfaces in sliding contact with said slide discs to confine movement of the slide discs to reciprocative movement parallel to said first diametric plane.

3. A screw extruder assembly as defined in claim 2, wherein said guide surfaces of said side frame portions are flat surfaces lying in a pair of planes paralleling said first diametric plane and said slidable sealing discs are in the shape of thin truncated circular discs having a pair of opposite flat edge portions extending along chords of the circular path of said cylindrically curved edge portions of the discs equally spaced from the center of the disc and positioned in sliding contact with the guide surfaces of said slide frame portions to be guided thereby.

4. A screw extruder assembly as defined in claim 1, wherein said rotor member includes an axially short cylindrical upstream end portion to be removably assembled to the discharge end of said screw and having a downstream end portion of smaller diametric size than the diameter of the helically contoured rotor portion.

5. A screw extruder assembly as defined in claim 2, wherein said rotor memeber includes an axially short cylindrical upstream end portion to be removably assembled to the discharge end of said screw and having a downstream end portion of smaller diametric size than the diameter of the helically contoured rotor portion.

6. A screw extruder assembly as defined in claim 3, wherein said rotor member includes an axially short cylindrical upstream end portion to be removably assembled to the discharge end of said screw and having a downstream end portion of smaller diametric size than the diameter of the helically contoured rotor portion.

7. A screw extruder assembly as defined in claim 4, wherein said cylindrical upstream end portion is provided with an internally threaded socket formation opening through the upstream end thereof and the discharge end of said screw is provided with an externally threaded end portion sized to interfit and be threadedly coupled in the threaded socket of said rotor member and said downstream end portion of said rotor member being of non-round crosssectional configuration for receiving a similarly shaped tool portion for manually assembling and disassembling the rotor member with the screw.

8. A screw extruder assembly as defined in claim 5, wherein said cylindrical upstream end portion is provided with an internally threaded socket formation opening through the upstream end thereof and the discharge end of said screw is provided with an externally threaded end portion sized to interfit and be threadedly coupled in the threaded socket of said rotor member and said downstream end portion of said rotor member being of non-round crosssectional configuration for receiving a similarly shaped tool portion for manually assembling and disassembling the rotor member with the screw.

9. A screw extruder assembly as defined in claim 6, wherein said cylindrical upstream end portion is provided with an internally threaded socket formation opening through the upstream end thereof and the discharge end of said screw is provided with an externally threaded end portion sized to interfit and be threadedly coupled in the threaded socket of said rotor member and said downstream end portion of said rotor member being of non-round crosssectional configuration for receiving a similarly shaped tool portion for manually assemblying and disassembling the rotor member with the screw.

10. A screw extruder assembly as defined in claim 4, wherein said cylindrical upstream end portion includes a pair of opposite circumferential interruptions in the outer portion thereof in the direction of said first diametric plane defining passages for admitting the plastic material into the pocket formations defined between the outer curved edge portions of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

11. A screw extruder assembly as defined in claim 5, wherein said cylindrical upstream end portion includes a pair of opposite circumferential interruptions in the outer portion thereof in the direction of said first diametric plane defining passages for admitting the plastic material into the pocket formations defined between the outer curved edge portions of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

12. A screw extruder assembly as defined in claim 6, whereby said cylindrical upstream end portion includes a pair of opposite circumferential interruptions in the outer portion thereof in the direction of said first diametric plane defining passages for admitting the plastic material into the pocket formations defined between the outer curved edge portions of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

13. A screw extruder assembly as defined in claim 7, wherein said cylindrical upstream end portion includes a pair of opposite circumferential interruptions in the outer portion thereof in the direction of said first diametric plane defining passages for admitting the plastic material into the pocket formations defined between the outer curved edge portions of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

14. A screw extruder assembly as defined in claim 8, wherein said cylindrical upstream end portion includes a pair of opposite circumferential interruptions in the outer portion thereof in the direction of said first diametric plane defining passages for admitting the plastic material into the pocket formations defined between the outer curved edge portions of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

15. A screw extruder assembly for plasticating or melting solid plastic material of the like, comprising a barrel defining an elongated cylindrical bore having an upstream end and an outlet end, a screw rotatably housed in an upstream portion of said bore and having a feed end and a discharge end, said screw having a mixing section between the feed end and discharge end thereof comprising at least one pair of substantially parallel, helical, first and second threads integral with the core of said screw, said first thread of the pair originating at the feed end of said screw creating a helical channel and having a minimum clearance to the surface of said bore, said second thread of the pair originating at a location about one-third to two-thirds of the length of said screw from the feed end of said screw by rising from the core of said screw and having a large clearance to said bore surface comparable to or greater than the size of the components of said solid plastic material, said second thread of the pair dividing said helical channel created by said first thread into two sub-channels of substantially equal width, one located toward the feed end of said screw from said second thread and the other located toward the discharge end of said screw from said second thread, the depth of the sub-channel located toward the feed end gradually increasing to a maximum comparable to the depth of said helical channel at the feed end of said screw accompanied by gradual decrease of the depth of the other sub-channel to a minimum comparable to or greater than the size of the components of said solid plastic material, a positive displacement wave pump in said bore located between the discharge end of said screw and said outlet end, said pump having a stator frame provided with cylindrical outer surface portions engaging and conforming to the surface of said cylindrical bore and being supported against rotation in the bore, a rotor member having a helically contoured outer surface defining a plural turn helical thread formation of wide rounded form to orbit about the extended center axis of said extruder screw, means coupling said rotor member to the discharge end portion of said screw to be driven thereby for rotation in the stator frame, a slide disc stack of a plurality of slidable sealing discs in face to face contact with each other extending along the major portion of the axial length of the stator frame and supported thereby for reciprocative sliding movement parallel to a first diametric plane of said cylindrical bore, the slide discs forming sealing discs having opposite outwardly convex cylindrically curved surface edge portions to be moved toward confronting surface portions of said cylindrical barrel into sealing engagement therewtih and be withdrawn to a range of positions spaced from said bore surface portions toward the center axis thereof by said rotor member upon rotation of the latter, the discs having shaped center apertures receiving the rotor member therethrough and accommodating movement of the full diametric range of movement of the crests of said helical thread means in a second diametric direction perpendicular to said first diametric plane, the rotor and sealing slide discs and confronting surface of said bore forming a series of pumping pockets between the convex outer edge portions of the sealing discs and the surface of the barrel which pumping pockets are moved longitudinally through the pump to force the plastic material to move toward the discharge end of the positive displacement wave pump section.

16. A screw extruder assembly as defined in claim 15, wherein said stator frame includes a pair of diametrically opposite side frame portions joining an inlet portion and extending substantially the actual length of the slide disc stack spaced transversely from the center axis of the bore in said second diametric direction and having inwardly facing guide surfaces in sliding contact with said slide discs to confine movement of the slide discs to reciprocative movement parallel to said first diametric plane.

17. A screw extruder assembly as defined in claim 16, wherein said guide surfaces of said frame portions are flat surfaces lying in a pair of planes paralleling said first diametric plane and said slidable sealing discs are in the shape of thin truncated circular discs having a pair of opposite flat edge portions extending along chords of the circular path of cylindrically curved edge portions of the discs equally spaced from the center of the disc and positioned in sliding contact with the guide surfaces of said side frame portions to be guided thereby.

18. A screw extruder assembly as defined in claim 15, whereby said rotor member includes an axially short cylindrical upstream end portion to be removably assembled to the discharge end of said screw and having a downstream end portion of smaller diametric size than the diameter of the helically contoured rotor portion.

19. A screw extruder assembly as defined in claim 18, wherein said cylindrical upstream end portion is provided with an internally threaded socket formation opening through the upstream end thereof and the discharge end of said screw is provided with an externally threaded end portion sized to interfit and be threadedly coupled in the threaded socket of said rotor member and said downstream end portion of said rotor member being of non-round crosssectional configuration for receiving a similarly shaped tool portion for manually assembling and disassembling the rotor member with the screw.

20. A screw extruder assembly as defined in claim 18, wherein said cylindrical upstream end portion includes a pair of opposite circumferential interruptions in the outer portion thereof in the direction of said first diametric plane defining passages for admitting the plastic material into the pocket formations defined between the outer curved edge portion of the discs and the confronting surface of the bore and having an upstream facing bevelled throat and passages therefrom communicating with spaces between the center apertures of the discs and the helically contoured outer surface of the rotor member in said second diametric direction for passage of the plastic material through the portions of said shaped center apertures of the discs not in sealing contact with the rotor member contoured outer surface.

* * * * *